United States Patent
Sagimori

(10) Patent No.: US 9,036,214 B2
(45) Date of Patent: May 19, 2015

(54) DITHER MATRIX GENERATING METHOD, IMAGE PROCESSING DEVICE, AND NON-TRANSITORY COMPUTER READABLE STORAGE MEDIUM STORING PROGRAM

(71) Applicant: Yuuki Sagimori, Kanagawa (JP)

(72) Inventor: Yuuki Sagimori, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/100,258

(22) Filed: Dec. 9, 2013

(65) Prior Publication Data

US 2014/0226187 A1   Aug. 14, 2014

(30) Foreign Application Priority Data

Feb. 8, 2013  (JP) .................. 2013-023487

(51) Int. Cl.
*G06K 15/00* (2006.01)
*G06K 15/02* (2006.01)
*H04N 1/405* (2006.01)
*H04N 1/409* (2006.01)

(52) U.S. Cl.
CPC ............ *G06K 15/1881* (2013.01); *H04N 1/405* (2013.01); *H04N 1/4092* (2013.01); *G06K 15/1876* (2013.01)

(58) Field of Classification Search
None
See application file for complete search history.

(56) References Cited

U.S. PATENT DOCUMENTS

| | | | | |
|---|---|---|---|---|
| 4,924,301 A | * | 5/1990 | Surbrook | 358/534 |
| 5,166,809 A | * | 11/1992 | Surbrook | 358/1.9 |
| 5,617,123 A | | 4/1997 | Takaoka et al. | |
| 7,239,429 B2 | * | 7/2007 | Huang et al. | 358/3.06 |
| 7,715,053 B2 | * | 5/2010 | Kakutani | 358/3.06 |
| 7,733,533 B2 | * | 6/2010 | Stanich et al. | 358/3.13 |
| 7,746,502 B2 | * | 6/2010 | Yasutomi et al. | 358/3.13 |
| 7,764,402 B2 | * | 7/2010 | Kakutani et al. | 358/3.13 |
| 7,782,493 B2 | * | 8/2010 | Asai et al. | 358/3.19 |
| 7,898,693 B2 | * | 3/2011 | Kakutani | 358/3.13 |
| 7,911,645 B2 | | 3/2011 | Sagimori | |
| 8,169,666 B2 | * | 5/2012 | Asai | 358/3.06 |
| 8,363,279 B2 | * | 1/2013 | Kikuchi et al. | 358/3.06 |
| 8,625,163 B2 | * | 1/2014 | Shimahashi | 358/3.13 |
| 8,681,383 B2 | * | 3/2014 | Wang et al. | 358/3.06 |
| 8,746,829 B2 | * | 6/2014 | Asai | 347/15 |
| 2003/0058482 A1 | * | 3/2003 | Morimatsu | 358/457 |
| 2010/0245853 A1 | * | 9/2010 | Aonuma | 358/1.5 |

(Continued)

FOREIGN PATENT DOCUMENTS

| | | |
|---|---|---|
| JP | 01-249350 | 10/1989 |
| JP | 2002-010079 | 1/2002 |
| JP | 2003-152999 | 5/2003 |

OTHER PUBLICATIONS

European Search Report dated Feb. 26, 2014 in corresponding.

(Continued)

*Primary Examiner* — Dung Tran
(74) *Attorney, Agent, or Firm* — Cooper & Dunham LLP

(57) ABSTRACT

Disclosed is a dither matrix generating method in which halftone dots are formed by growing corresponding dots. The dither matrix generating method includes a first generating step of generating first threshold values of a dither matrix, so that the dots are grown until a predetermined halftone dot area ratio is achieved, wherein, when the predetermined halftone dot area ratio is achieved, the halftone dots contact each other; and a second generating step of generating second threshold values of the dither matrix, so that the dots grow beyond the predetermined halftone dot area ratio.

5 Claims, 7 Drawing Sheets

(56) References Cited

U.S. PATENT DOCUMENTS

2012/0147431 A1* 6/2012 Kashibuchi .................. 358/3.27
2013/0027753 A1* 1/2013 Yoshida ....................... 358/3.13

OTHER PUBLICATIONS

European patent application No. 13 19 7191.3.

* cited by examiner

HALFTONE DOT

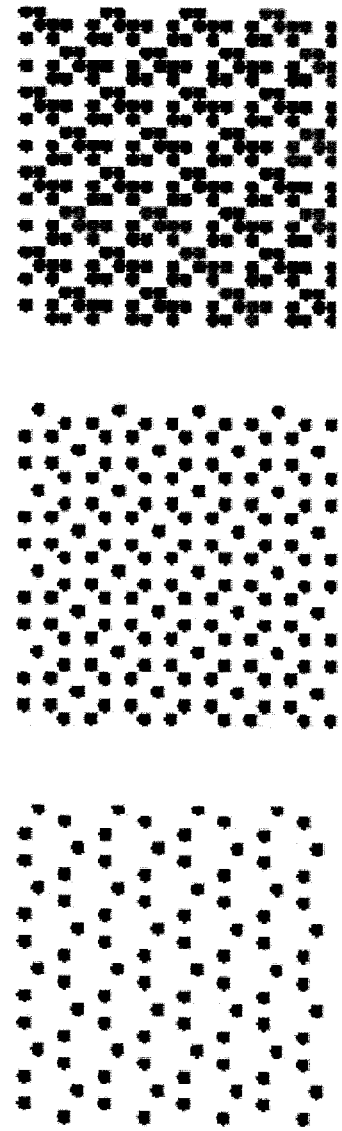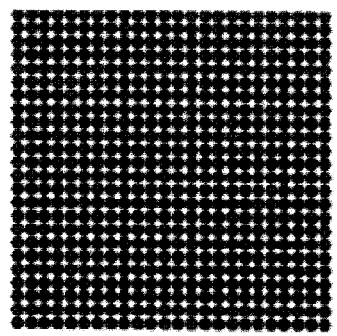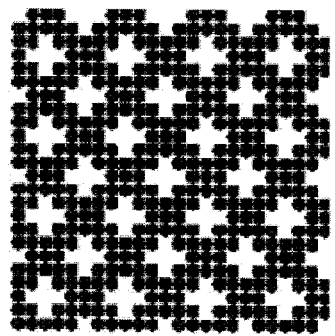
FIG.3

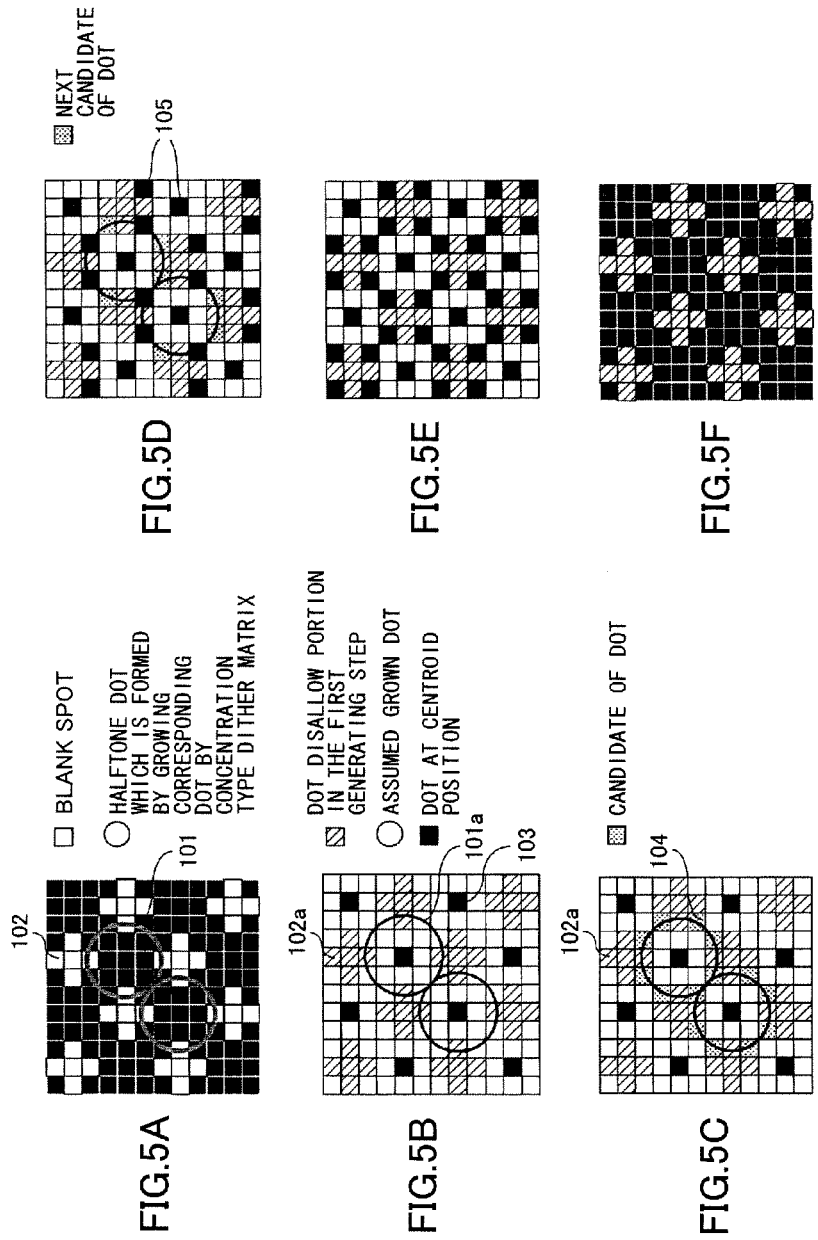

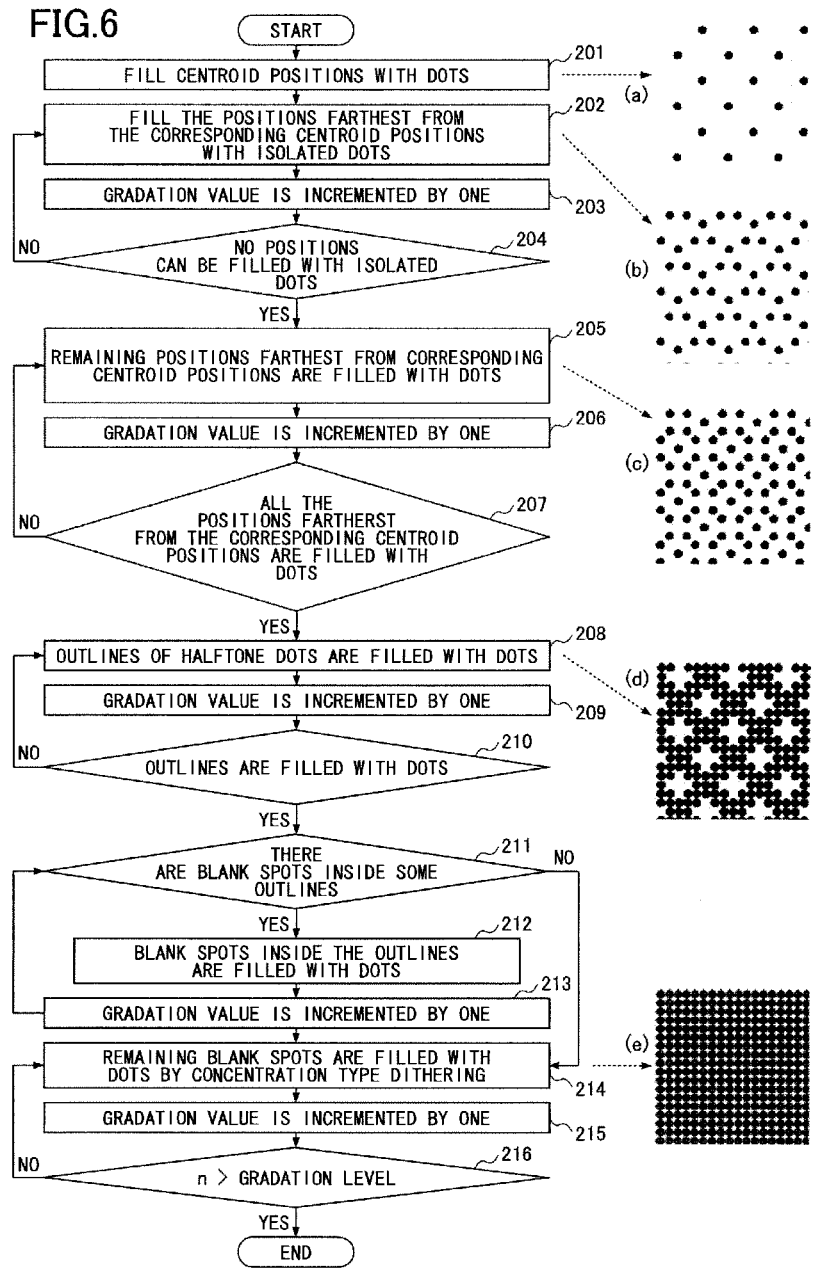

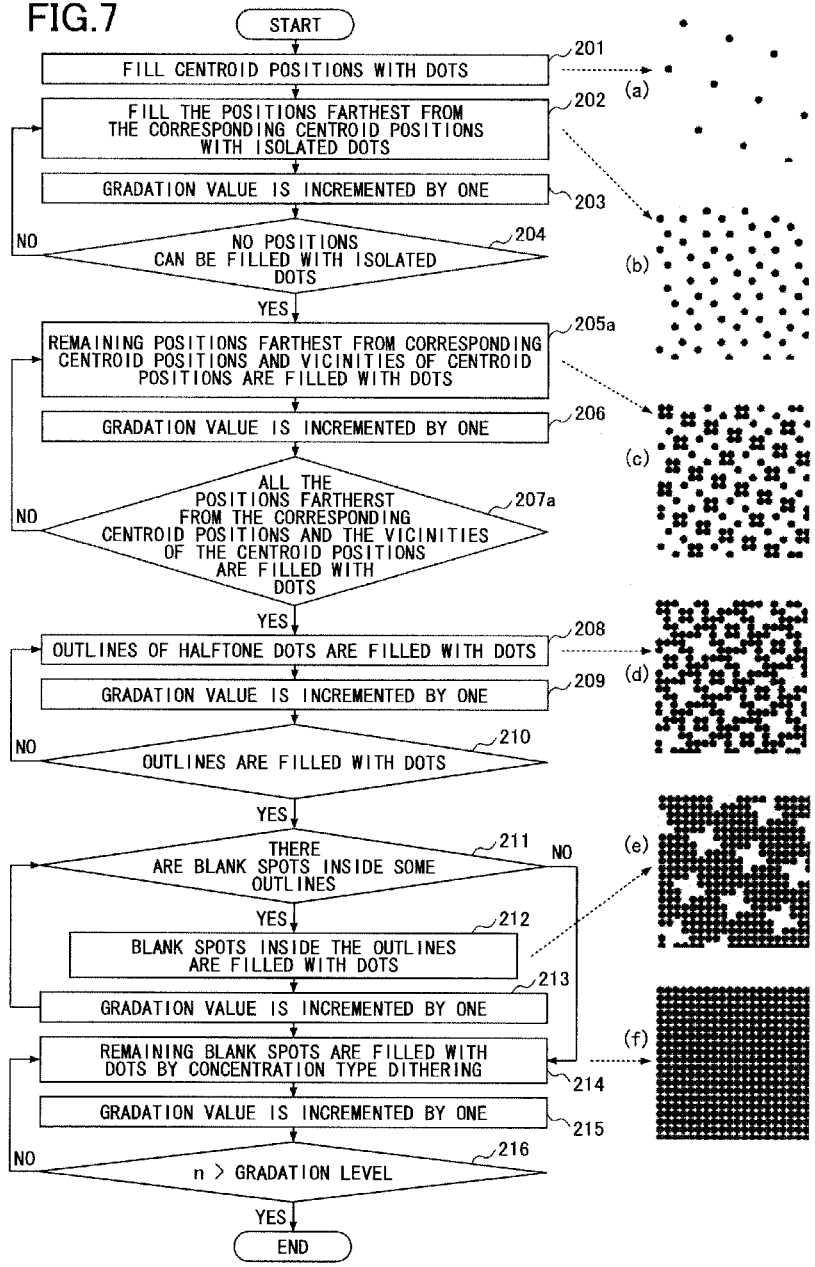

DITHER MATRIX GENERATING METHOD, IMAGE PROCESSING DEVICE, AND NON-TRANSITORY COMPUTER READABLE STORAGE MEDIUM STORING PROGRAM

BACKGROUND OF THE INVENTION

1. Field of the Invention

The present invention relates to a dither matrix generating method, an image processing device, and a non-transitory computer readable storage medium storing a program.

2. Description of the Related Art

In a printing device that prints an image by forming dots on a printing medium, since a number of available gradation values for a dot is limited relative to a number of gradation values which can be input, gradation is expressed by halftone processing.

As an example of the halftone processing, a dithering method can be considered. In the dithering method, a halftone is reproduced by a combination of density gradation (intensity modulation) and area gradation (area modulation), for which a number of levels is fewer than that of the original (cf. Patent Document 1 (Japanese Unexamined Patent Publication No. 2003-152999), for example).

A concentration type dither matrix is often used in halftone processing, for which a dither method according to related art is applied. The concentration type dither matrix is often used because it demonstrates good dot reproducibility and high image quality. However, when the concentration type dither matrix is utilized in a low density portion, a gap tends to be generated between neighboring dots, and a fine line tends to be broken. In this regard, by using distributed dithering or non-periodic dithering, breaking of a fine line has been reduced.

However, an effect of reducing breaking of a fine line is not so strong for the distributed dithering. In addition, the distributed dithering may cause a color shift, for example, and may lower image quality. For the non-periodic dithering, a size of a matrix may be increased. Accordingly, printing speed may be reduced, and cost may be increased due to an increase of required memory capacity.

An embodiment of the present invention has been developed in view of the above-described problems. It is desirable to provide a dither matrix generating method, which can reduce breaking of a fine line and which can enhance image quality. It is also desirable to provide an image processing method; an image processing device; and a program, in which the above-described dither matrix is utilized.

SUMMARY OF THE INVENTION

According to an aspect of the present invention, there is provided a dither matrix generating method. In the method, halftone dots are formed by growing corresponding dots. The method includes a first generating step of generating first threshold values of a dither matrix, so that the dots grow until a predetermined halftone dot area ratio is achieved, wherein, when the predetermined halftone dot area ratio is achieved, the halftone dots contact each other; and a second generating step of generating second threshold values of the dither matrix, so that the dots grow beyond the predetermined halftone dot area ratio.

According to another aspect of the present invention, there is provided an image processing device configured to output a halftone image by using a dither matrix generated by a dither matrix generating method in which halftone dots are formed by growing corresponding dots. The dither matrix generating method includes a first generating step of generating first threshold values of a dither matrix, so that the dots are grown until a predetermined halftone dot area ratio is achieved, wherein, when the predetermined halftone dot area ratio is achieved, the halftone dots contact each other; and a second generating step of generating second threshold values of the dither matrix, so that the dots grow beyond the predetermined halftone dot area ratio.

According to another aspect of the present invention, there is provided a non-transitory computer readable storage medium storing a program which causes a computer to perform a dither matrix generating method in which halftone dots are formed by growing corresponding dots. The dither matrix generating method includes a first generating step of generating first threshold values of a dither matrix, so that the dots are grown until a predetermined halftone dot area ratio is achieved, wherein, when the predetermined halftone dot area ratio is achieved, the halftone dots contact each other; and a second generating step of generating second threshold values of the dither matrix, so that the dots grow beyond the predetermined halftone dot area ratio.

According to the embodiment of the present invention, breaking of the fine line can be reduced, and, at the same time, the image quality can be enhanced.

Other objects, features and advantages of the present invention will become more apparent from the following detailed description when read in conjunction with the accompanying drawings.

BRIEF DESCRIPTION OF THE DRAWINGS

FIG. 3 shows an example of half-toning by using dithering for reducing breaking of a fine line according to an embodiment of the present invention;

FIGS. 5A-5F are diagrams illustrating a dither matrix generating method according to the embodiment;

FIG. 6 shows a flowchart of a first example of the dither matrix generating method according to the embodiment; and FIG. 7 shows a flowchart of a second example of the dither matrix generating method according to the embodiment.

DETAILED DESCRIPTION OF THE PREFERRED EMBODIMENTS

Hereinafter, an embodiment of the present invention is explained in detail by referring to the accompanying drawings. According to the embodiment, a reference value of a halftone dot area ratio is set to be the halftone dot area ratio at a moment at which halftone dots of a concentration type dither matrix contact each other. A process prior to achieving the reference value is defined to be a first threshold value generating step, and breaking of a fine line is reduced. Once the halftone dots contact each other, a fine line is not to be broken after that. Accordingly, the process subsequent to achieving the reference value is defined to be a second threshold value generating step. In the second threshold value generating step, dot reproducibility is improved and image quality is enhanced by using a concentration type dither matrix.

Figure 1:
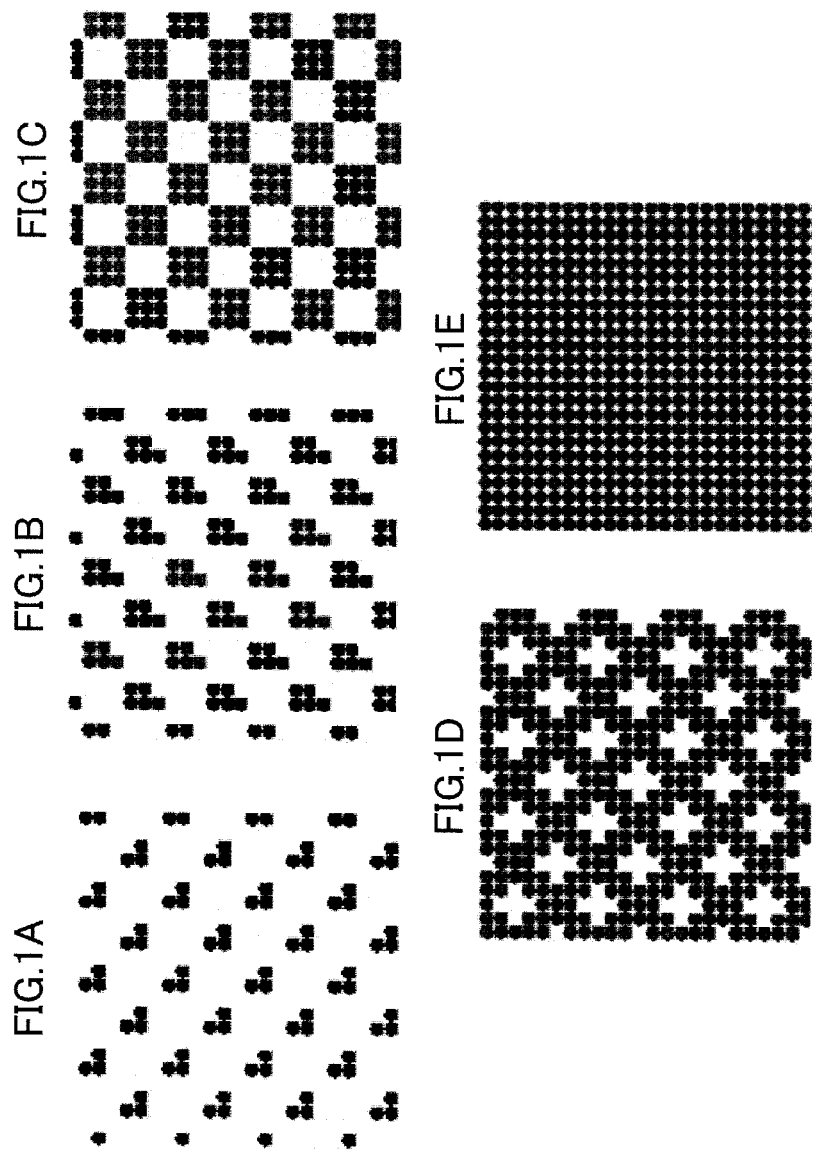
FIGS. 1A-1E show examples of half-toning by using a concentration type dither matrix.

In a printing device that prints an image by forming dots on a printing medium, since a number of available gradation values is limited relative to a number of gradation values which can be input, gradation is expressed by halftone processing. FIGS. 1A-1E show examples of half-toning to which concentration type dithering is applied. In FIG. 1A, since the area ratio of the halftone dots is small, the density is low. The density increases in an order of 1B, 1C, 1D, and 1E.

In the concentration type dithering, since dots are formed while concentrating the dots, dot reproducibility is good and image quality is high. However, in a low density portion, since a gap tends to be formed between dots, a fine line tends to be broken. As the area ratio of the halftone dots is increased while applying the concentration type dithering, the concentrated dots grow, and thereby a single large halftone dot is formed.

Figure 2:
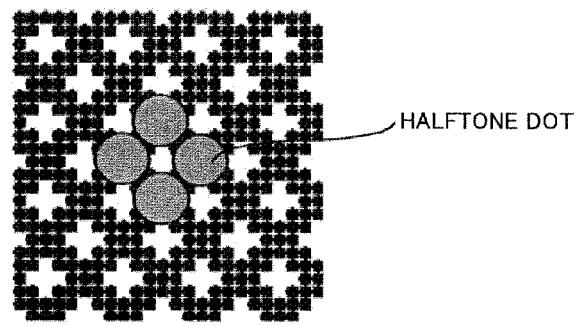
FIG. 2 is a diagram showing an example of a halftone dot area ratio of halftone dots, with which a fine line tends not to be broken.

FIG. 2 shows an example of a halftone dot area ratio of halftone dots, with which a fine line tends not to be broken. In the example of FIG. 2, halftone dots, which become large, contact each other. When the halftone dots contact each other in this manner, a gap may not be generated between the halftone dots. Accordingly, a fine line may not be broken.

FIG. 3 shows an example of half-toning, for which dithering according to the embodiment is applied. The dithering according to the embodiment reduces breaking of a fine line. FIG. 3 shows that, in the halftone processing prior to achieving the halftone area dot ratio with which a fine line tends not to be broken (cf. FIG. 2), dots are dispersed as much as possible. By doing this, some dots are generated at corresponding positions, at which a fine line would be broken, if the concentration type dithering were applied. In this manner, a fine line tends not to be broken in the halftone processing prior to achieving the halftone area dot ratio with which a fine line tends not to be broken. For the halftone processing subsequent to achieving the halftone area dot ratio with which a fine line tends not to be broken, dots are stabilized and image quality is enhanced by using concentration type dithering.

Figure 4:
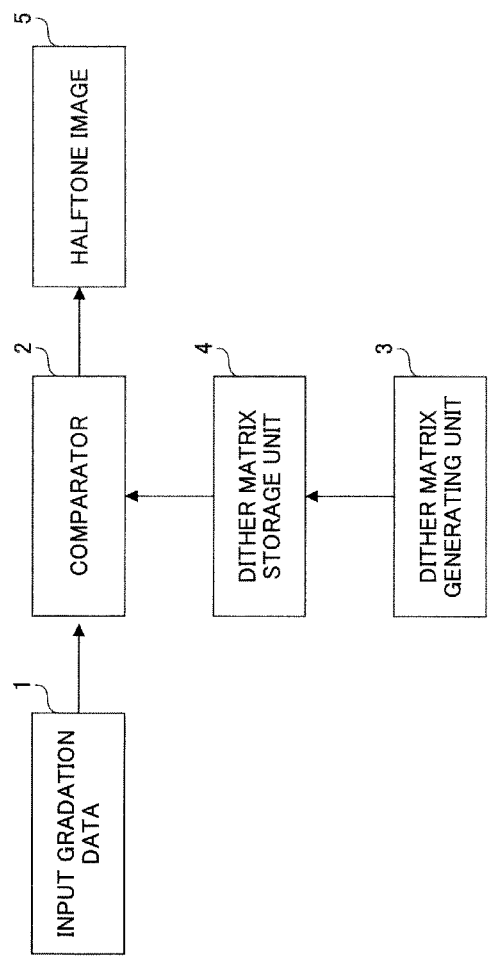
FIG. 4 shows a configuration of an image processing device according to the embodiment.

FIG. 4 shows a configuration of an image processing device according to the embodiment. In FIG. 4, the reference numeral 1 denotes input gradation data; the reference numeral 2 denotes a comparator; the reference numeral 3 denotes a dither matrix generating unit; the reference numeral 4 denotes a dither matrix storage unit; and the reference numeral 5 denotes a halftone image. A dither matrix which is generated by the dither matrix generating unit 3 is stored in the dither matrix storage unit 4. The comparator 2 compares each of pixel values of the input gradation data 1 with a corresponding threshold value, which is read out from the dither matrix storage unit 4, and the comparator 2 outputs a halftone image (binary values or small values).

Next, a dither matrix generating method according to the embodiment is concretely explained. First, a concentration type dither matrix is utilized, and a halftone dot area ratio at a moment at which halftone dots contact each other is set to be a reference value. A threshold value generating process prior to the halftone dot area ratio achieving the reference value is defined to be a first threshold value generating process. In the first threshold value generating process, threshold values are generated by using a plurality of threshold value generating methods. A threshold value generating process subsequent to the halftone dot area ratio achieving the reference value is defined to be a second threshold value generating process. In the second threshold value generating process, a concentration type dither matrix is utilized. FIGS. 5A-5F are diagrams illustrating the dither matrix generating method according to the embodiment.

<First Threshold Value Generating Process 1>

Dots are grown by using the concentration type dither matrix in which predetermined threshold values are arranged (e.g., dither matrices corresponding to FIGS. 1A-1E are prepared in a memory), until the halftone dots contact each other (FIG. 5A). In FIG. 5A, the reference numeral 101 denotes a halftone dot and the reference numeral 102 denotes a blank spot (dots for which the binary value is 0).

All of the threshold values are cleared for the concentration type dither matrix, with which the dots are grown as described above. As shown in FIG. 5B, a position of each of the blank spots 102 is stored as a dot disallowed portion 102a in the memory (in the first threshold value generating process, it is disallowed to use the dot disallowed portion 102a). Further, a centroid position (geometric center) 103 of each of the halftone dots 101a is recorded, while assuming that the corresponding dot grows to be a single large halftone dot. Then, threshold values are generated so that the minimum dots occur at corresponding centroid positions 103 of the halftone dots 101a (values are assigned in an ascending order from the minimum value of 1). Here, instead of clearing the threshold values as described above, the threshold values may be overwritten.

<First Threshold Value Generating Process 2>

Each of the positions farthest from the centroid position 103 of the corresponding halftone dot, which position does not overlap with the dot disallowed portions (the blank spots) 102a, is set to be a dot candidate (candidate position) 104 (FIG. 5C).

<First Threshold Value Generating Process 3>

For each candidate position 104, a corresponding threshold value 105 is generated (sequentially assign values which are greater than the values assigned in <First threshold value generating process 1>), so that isolated dots are formed (to prevent the dots from neighboring each other) from the dot candidates 104 (FIG. 5D).

<First Threshold Value Generating Process 4>

After completing embedding the isolated dots, threshold values are generated so that dots are embedded into remaining candidate positions 104 (sequentially assign values which are greater than the values assigned in <First threshold value generating process 3>) (FIG. 5E). At this time, if a single isolated point is insufficient for filling the centroid position 103, the centroid position 103 may be stabilized by embedding another dot in the vicinity of the dot which is embedded into the centroid position 103.

<First Threshold Value Generating Process 5>

Threshold values are generated so that dots are embedded into the outline positions of the halftone dots (sequentially assign values which are greater than the corresponding values assigned in <First threshold value generating process 4>) (FIG. 5F).

The first threshold value generating process is completed by the above-described generating processes, and subsequently the process proceeds to the second threshold value generating process. In the second threshold value generating process, threshold values are generated by a concentration type dither matrix, so that the blank spots 102 are filled with dots.

FIG. 6 shows a flowchart of a first example of the dither matrix generating method according to the embodiment. In FIG. 6, an n-gradation level dither matrix is generated. While sequentially increasing a gradation level one gradation level by one gradation level, threshold values are generated under corresponding determination conditions. The number of the gradation levels depends on a size of the dither matrix. For example, when the size of the dither matrix is 24×24, the number of the gradation levels is n=24×24=576.

At step 201, as shown in (a) of FIG. 6, dots are embedded into the centroid positions 103 of the corresponding halftone dots. At step 202, as shown in (b) of FIG. 6, each of the positions farthest from the centroid position 103 of the corresponding halftone dot is filled with a corresponding isolated dot. At step 203, a gradation value is incremented by one, and the processes of steps 202 and 203 are repeated until there are no positions which are farthest from the corresponding centroid positions 103, and which can be filled with corresponding isolated dots.

When there are no positions which can be filled with the corresponding isolated dots (yes at step 204), as shown in (c) of FIG. 6, each of the remaining positions farthest from the corresponding centroid position 103 is filled with a dot. At step 206, the gradation value is incremented by one, and the processes of steps 205 and 206 are repeated until there are no positions which are farthest from the corresponding centroid positions 103 and which can be filled with corresponding dots.

When all the positions farthest from the corresponding centroid positions 103 are filled with corresponding dots (yes at step 207), at step 208, each of outlines of the corresponding halftone dot is filled with dots, as shown in (d) of FIG. 6. At step 209, the gradation value is incremented by one, and the processes of steps 208 and 209 are repeated until all the outlines are filled with dots.

When all the outlines are filled with dots (yes at step 210), and when there is a blank spot inside the corresponding outline (yes at step 211), the blank spot is filled with a dot (step 212). At step 213, the gradation value is incremented by one, and the processes of steps 212 and 213 are repeated until all the blank spots inside the corresponding outlines are filled with dots. When there are no blank spots inside the corresponding outlines (no at step 211), at step 214, threshold values are generated so that blank spots are filled with dots by using a concentration type dither matrix, as shown in (e) of FIG. 6. At step 215, the gradation value is incremented by one. When the gradation value n becomes greater than a predetermined gradation level (e.g., 576) (yes at step 216), the process is terminated.

FIG. 7 shows a flowchart of a second example of the dither matrix generating method according to the embodiment. FIG. 7 shows an example in which the vicinity of a centroid position 103 of the corresponding halftone dot 101a may not be filled with an isolated dot, due to the size of the halftone dot 101a or the size of the matrix. The process of FIG. 7 is different from that of FIG. 6 in step 205a ((c) of FIG. 7). At step 205a, the vicinity of the centroid position 103 of the corresponding halftone dot 101a (which is the neighborhood of the centroid position 103) is filled with neighboring four dots. The other processes at the corresponding steps are the same as those of FIG. 6. Here, after the positions farthest from the corresponding centroid positions 103 are filled with the isolated dots, the remaining positions farthest from the corresponding centroid position 103 and the vicinity of the corresponding centroid position 103 may be alternately filled with dots.

Since the dot reproducibility differs depending on an image forming device, if an unnecessary pattern is conspicuous, threshold values can be generated by the second example of the dither matrix generating method, which is shown in FIG. 7. Depending on the size of the halftone dot 101a, it is possible that some blank spots remain after filling the outlines with the dots. In such a case, inside each of the outlines may be filled with dots, and subsequently remaining blank spots may be filled with dots by using a concentration type dither matrix.

A dither matrix for each color version is generated by the dither matrix generating method according to the embodiment. The threshold values of the corresponding dither matrices, which are generated as described above, are normalized in accordance with an input gradation value.

As described above, the dither matrix generating method according to the embodiment is based on the concentration type dither matrix. Accordingly, even if the size of the matrix is enlarged, the printing speed may not be reduced. In addition, since the memory capacity need not be increased, the cost may not be increased. In the dither matrix generating method according to the embodiment, the reference value of the halftone dot area ratio is set to be the halftone dot area ratio at the moment at which the halftone dots of the concentration type dither matrix contact each other. The process prior to achieving the reference value is defined to be the first threshold value generating step, and breaking of a fine line is reduced. Once the halftone dots contact each other, a file line may not be broken. Thus, the process after achieving the reference value is defined to be the second threshold value generating step, and the dot reproducibility is improved by using the concentration type dither matrix. In this manner, breaking of a fine line is reduced, and at the same time image quality is enhanced.

The dither matrix generating method is not limited to the above-described embodiment. The dither matrix generating method can be achieved by using a computer having a generic configuration including a CPU, a memory, and the like. The scope of the present invention also includes a program that causes a computer to perform the dither matrix generating method according to the embodiment, and a non-transitory storage medium storing a program that causes a computer to perform the dither matrix generating method according to the embodiment.

The present invention is not limited to the specifically disclosed embodiment, and variations and modifications may be made without departing from the scope of the present invention.

The present application is based on and claims the benefit of priority of Japanese Priority Application No. 2013-023487 filed on Feb. 8, 2013, the entire contents of which are hereby incorporated herein by reference.

What is claimed is:

1. A dither matrix generating method in which halftone dots are formed by growing corresponding dots, the dither matrix generating method comprising:

a first generating step performed by an image processing device of generating first threshold values of a dither matrix, so that the dots are grown until a predetermined halftone dot area ratio is achieved, wherein, when the predetermined halftone dot area ratio is achieved, the halftone dots contact each other; and a second generating step of generating second threshold values of the dither matrix, so that the dots grow beyond the predetermined halftone dot area ratio, wherein the first generating step performed by the image processing device includes a first process of growing the dots by using a predetermined dither matrix, recording centroid positions of the corresponding halftone dots at a moment at which the halftone dots contact each other and blank dot positions at which dots do not grow, and assigning threshold values to the corresponding centroid positions of the halftone dots in an ascending order from a smallest value among the threshold values;

a second process of assigning, in an ascending order, threshold values greater than the threshold values of the first process to positions at which corresponding isolated dots are to be generated, wherein the positions are included in candidate positions, the candidate positions being defined to be positions farthest from the corresponding centroid positions, except for the blank dot positions;

a third process of assigning threshold values greater than the threshold values of the second process in an ascending order to remaining candidate positions; and a fourth process of assigning threshold values greater than the threshold values of the third process in an ascending order to outline positions of the corresponding halftone dots.

2. The dither matrix generating method according to claim 1, wherein the third process includes a process of assigning a plurality of neighboring threshold values in an ascending order to vicinities of the corresponding centroid positions of the halftone dots.

3. The dither matrix generating method according to claim 1, wherein the second generating step includes a process of generating the second threshold values of the dither matrix, wherein the second threshold values are for forming dot-concentration type halftone dots.

4. An image processing device configured to output a halftone image by using a dither matrix generated by a dither matrix generating method in which halftone dots are formed by growing corresponding dots, the dither matrix generating method comprising:

a first generating step of generating first threshold values of a dither matrix, so that the dots are grown until a predetermined halftone dot area ratio is achieved, wherein, when the predetermined halftone dot area ratio is achieved, the halftone dots contact each other; and a second generating step of generating second threshold values of the dither matrix, so that the dots grow beyond the predetermined halftone dot area ratio, wherein the first generating step includes a first process of growing the dots by using a predetermined dither matrix, recording centroid positions of the corresponding halftone dots at a moment at which the halftone dots contact each other and blank dot positions at which dots do not grow, and assigning threshold values to the corresponding centroid positions of the halftone dots in an ascending order from a smallest value among the threshold values;

a second process of assigning, in an ascending order, threshold values greater than the threshold values of the first process to positions at which corresponding isolated dots are to be generated, wherein the positions are included in candidate positions, the candidate positions being defined to be positions farthest from the corresponding centroid positions, except for the blank dot positions;

a third process of assigning threshold values greater than the threshold values of the second process in an ascending order to remaining candidate positions; and a fourth process of assigning threshold values greater than the threshold values of the third process in an ascending order to outline positions of the corresponding halftone dots.

5. A non-transitory computer readable storage medium storing a program which causes a computer to perform a dither matrix generating method in which halftone dots are formed by growing corresponding dots, the dither matrix generating method comprising:

a first generating step of generating first threshold values of a dither matrix, so that the dots are grown until a predetermined halftone dot area ratio is achieved, wherein, when the predetermined halftone dot area ratio is achieved, the halftone dots contact each other; and a second generating step of generating second threshold values of the dither matrix, so that the dots grow beyond the predetermined halftone dot area ratio, wherein the first generating step includes a first process of growing the dots by using a predetermined dither matrix, recording centroid positions of the corresponding halftone dots at a moment at which the halftone dots contact each other and blank dot positions at which dots do not grow, and assigning threshold values to the corresponding centroid positions of the halftone dots in an ascending order from a smallest value among the threshold values;

a second process of assigning, in an ascending order, threshold values greater than the threshold values of the first process to positions at which corresponding isolated dots are to be generated, wherein the positions are included in candidate positions, the candidate positions being defined to be positions farthest from the corresponding centroid positions, except for the blank dot positions;

a third process of assigning threshold values greater than the threshold values of the second process in an ascending order to remaining candidate positions; and a fourth process of assigning threshold values greater than the threshold values of the third process in an ascending order to outline positions of the corresponding halftone dots.

* * * * *